Figure 1:
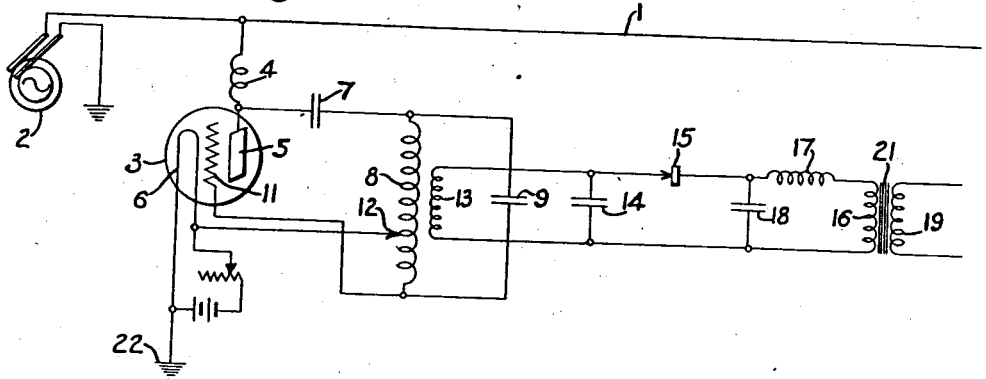

Nov. 27, 1928.

C. T. ALLCUTT 1,693,426

TRANSMISSION DEVICE

Filed Dec. 20, 1923

2 Sheets-Sheet 1

WITNESSES:
A. J. Butler.
W. H. Whitter Jr.

INVENTOR
Chester T. Allcutt.
BY
Wesley G. Carr
ATTORNEY

Nov. 27, 1928.

C. T. ALLCUTT 1,693,426

TRANSMISSION DEVICE

Filed Dec. 20, 1923

2 Sheets-Sheet 2

WITNESSES:
R. J. Butler.

INVENTOR
Chester T. Allcutt.
BY
Wesley G. Carr
ATTORNEY

Patented Nov. 27, 1928.

1,693,426

UNITED STATES PATENT OFFICE.

CHESTER T. ALLCUTT, OF PITTSBURGH, PENNSYLVANIA, ASSIGNOR TO WESTINGHOUSE ELECTRIC & MANUFACTURING COMPANY, A CORPORATION OF PENNSYLVANIA.

TRANSMISSION DEVICE.

Application filed December 20, 1923. Serial No. 681,875.

This invention relates to power transmission systems and particularly to means for obtaining a small amount of power from a high-tension transmission line without employing a relatively expensive transformer of the ordinary type having a core and windings.

It is an object of this invention to provide a means for obtaining a small amount of power from a high-tension line that shall be inexpensive, readily installed, and not likely to get out of order.

It is another object of this invention to produce a vacuum tube device and a high-frequency circuit associated therewith which may serve as a means for obtaining a low-frequency, low-potential current from a low-frequency, high-potential line.

The vacuum tube device and high-frequency circuit constitute a frequency changer, therefore, from a broad view point, it may be said that this object of the invention is to provide a frequency-changing device associated with a transmission line. Such a device enables one to change from the frequency of the line to a frequency at which a transformer is more efficient, to transform the energy at this more convenient frequency to the desired potential, and then to again change the frequency to one which is suitable for the utilization of the energy at the new potential.

It is a further object of this invention to make use of the property of a vacuum-tube device energized by low-frequency alternating current which causes it to produce high-frequency oscillations having a low-frequency modulation for delivering power at low frequency.

It is a further object of this invention to combine into one system, two vacuum-tube devices having the property just mentioned whereby one of said devices shall deliver energy during one-half cycle of the low frequency and the other during the other half cycle, whereby a low frequency output of nearly pure sine wave form is obtained.

Heretofore, when it has been necessary to obtain a small amount of power from a high-tension line, a step-down transformer having an iron core and windings with the proper turn ratio has been used. It is difficult to design a high-voltage transformer intended to deliver a small amount of power in which the losses will not be disproportionately large. Also, the interest charge, resulting from the fact that the cost of such a transformer is high, constitutes an undesirably great factor in the cost of such small power.

The present invention avoids these difficulties by substituting a frequency changing device and a high-frequency transformer for the large and expensive transformer required for the usual transmission frequencies. The frequency-changing device generates a high frequency which is modulated at the frequency of the power line. A rectifier obtains from this high frequency current a current having the frequency of the modulation. A small transformer delivers the output of this rectifier to the load. The high-frequency transformers associated with the vacuum-tube devices are so small and inexpensive that the cost of such installations is much smaller than with the transformers formerly used.

Figure 2:
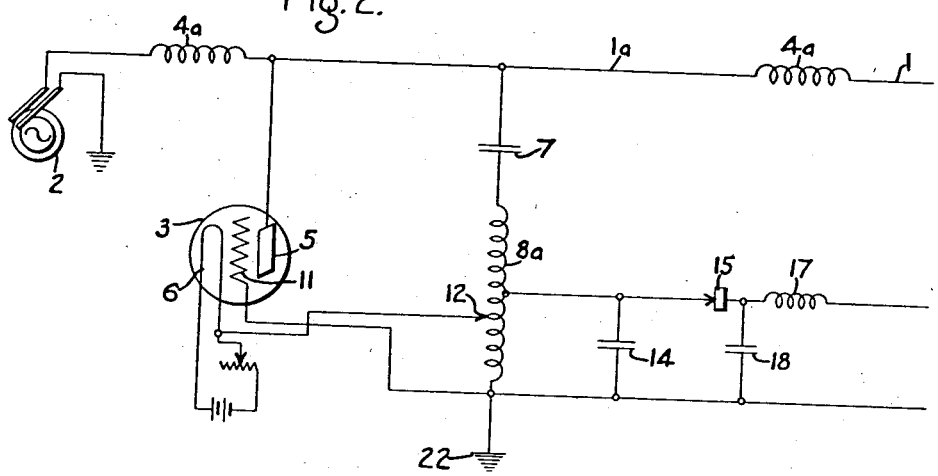
Figure 3:
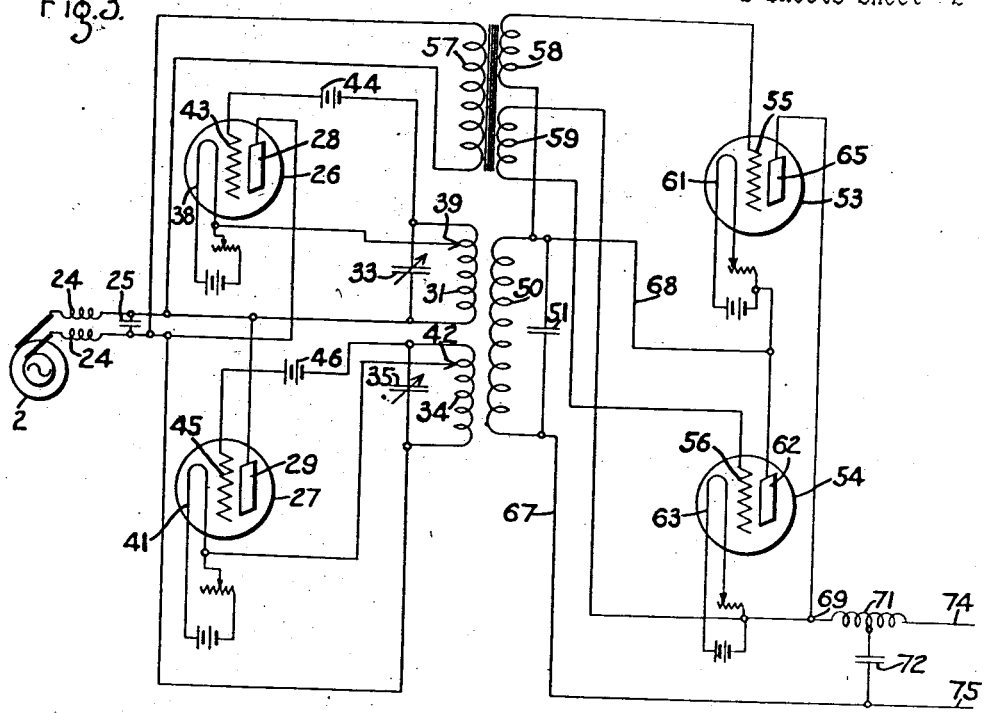
Figure 4:
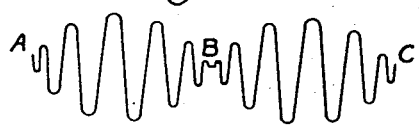
Figure 5:
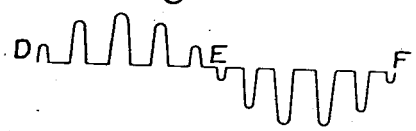

Other objects of my invention and details of construction will be apparent from the following description and accompanying drawings in which:

Figure 1 is a diagram showing the arrangement of apparatus and connections for one form of my device, Fig. 2 is a similar diagram for another form of device, Fig. 3 is a diagram showing the arrangement of the apparatus and connections when a double set of appliances is used to utilize both half cycles, Fig. 4 is a curve showing the current in the secondary of the high-frequency transformer of Fig. 3, and Fig. 5 is a curve showing the current in the output circuit in Fig. 3.

A line conductor 1 is supplied from a source 2 with alternating current of commercial frequency, for example 60 cycles. In ordinary practice, this line will be operated at high potential, but this is not essential to the practice of the invention. The line is connected to a vacuum device 3 by means of a high-frequency choke coil 4 leading to the anode 5. The external connection from the anode 5 to the cathode 6 includes a condenser 7, which acts as a stopping condenser for the low-frequency current. This connection also includes an inductance 8 and a capacity 9 in parallel. These form a circuit, resonant at a frequency considerably above the frequency of the line 1. The resonant circuit is connected to the grid 11. The connection to the cathode 6 is by means of an adjustable contact 12 so that the inductance 8 is adjustably apportioned between the plate circuit and the grid circuit. The amount of regeneration is thus controllable.

A coil 13 is inductively related to the coil 8. The two coils form a step-down transformer, preferably of the air core type, such as is ordinarily used in high frequency work. Connected across the terminals of the coil 13, is a condenser 14 of such size that the secondary circuit of the transformer is resonant to the same frequency as the primary. A rectifier 15 is connected to one side of the condenser 14, the output of the rectifier being through the primary coil 16 of a transformer 21 to the other side of the condenser 14. A low-frequency circuit is thus formed including coil 13, rectifier 15, and coil 16 in series. An inductance 17 and a condenser 18 are connected in series and in shunt respectively in this circuit to remove undesirable high-frequency currents from coil 16. The coil 16 is the primary and a coil 19 is the secondary of a transformer including an iron core 21 and intended for commercial frequencies.

In the operation of this form of the invention, the voltage of the line 1 applied to the plate circuit of the vacuum tube device causes it to produce oscillations. The period of these oscillations is determined by the natural period of the circuit including the inductance 8 and capacity 9. The portion of the inductance 8 between one end and the adjustable point 12 acts as a tickler coil, producing alternating potentials upon the grid 11, and so maintaining the oscillations. The condenser 7 prevents a short circuit of the low-frequency current, which otherwise would flow through the inductor 8 and point 12 to the ground at 22 and return to the source. The choke coil 4 prevents the high-frequency oscillations generated by the vacuum-tube device from reaching the line 1.

The high-frequency oscillations established in the circuit comprising inductor 8 and condenser 9 induce corresponding oscillations in the circuit comprising inductor 13 and condenser 14. A high frequency alternating electromotive force is thus impressed upon the rectifier 15. The amplitude of this alternating electromotive force is not constant because the amplitude of the oscillations in the first mentioned oscillating circuit varies in accordance with the voltage impressed upon the anode 5 of the vacuum tube 3. Since the line 1 supplies an alternating electromotive force, the anode 5 will be alternately positive and negative with respect to the filament 6. During the time that the anode 5 is negative, the vacuum tube will generate no oscillations. During the time that the anode is positive, oscillations will be produced in the inducing circuit which will vary in magnitude in accordance with the magnitude of the impressed voltage.

The current delivery from the rectifier 15 consists of a succession of groups of high-frequency pulses having a group frequency determined by the frequency of the voltage impressed upon the tube 3 by the line 1. The output from the rectifier is essentially a direct-current having a high-frequency alternating current and a low-frequency (group frequency) alternating current superimposed thereon. Because of the high inductance of the devices 16 and 17, the high-frequency alternating component of the current flows through the condenser 18. The direct-current component and the low-frequency alternating current component flow through the primary winding 16 of the transformer 21. The output, from the secondary winding 19 of the transformer 21 is a low-frequency alternating current of the same frequency as that of the current in the line 1.

Because of the character of the low-frequency modulation of the oscillations produced in the circuit comprising devices 8 and 9, the wave form of the output current of the transformer 21 will be somewhat distorted. This difficulty is emphasized by the fact that further distortion may be produced by reason of partial saturation of the iron core of the transformer 21 produced by the direct-current component of the current flowing in the primary winding 16. Furthermore, the direct current flowing in the circuit comprising devices 13, 15, 16 and 17 represents no useful work and introduces losses which lower the efficiency of the system. These difficulties have been largely overcome by an arrangement which will be described in connection with Fig. 3.

Fig. 2 is essentially the same as Fig. 1. Like reference characters are employed to designate apparatus corresponding to that of Fig. 1. The capacity, between a portion 1—a of the line 1 and the ground, serves instead of the condenser 9. This portion 1—a is separated from the remainder of the line by radio-frequency choke coils 4—a which serve instead of the single coil 4 in Fig. 1. Instead of the transformer 8—13 in Fig. 1, an autotransformer 8—a has been provided. These changes make no difference in the priciples of operation of the system and further description thereof is, therefore, unnecessary.

In Fig. 3, instead of showing the line 1, a source 2 is illustrated. This source is protected by choke coils 24 in series and a condenser 25 in shunt. It is obvious, however, that a line such as illustrated in Figs. 1 and 2 may be used if desired. Two three-element vacuum-tube devices 26 and 27 are shown. The plate 28 of one device is connected to one side of the source 2 and plate 29 of the other vacuum-tube device is connected to the other side of the source 2. The vacuum-tube device 26 is equipped with a resonant circuit including an inductance 31 and a condenser 33.

The vacuum-tube device 27 is equipped with a similar resonant circuit including an inductance 34 and a condenser 35, each of the circuits 31—33 and 34—35, being resonant at high frequency. One side of each of the condensers 33, 35 is connected to the source 2. The connection is to that side of the source which is not connected to the plate of the vacuum-tube device belonging to the condenser in question.

The cathode 38 of the vacuum tube 26 is connected to an adjustable point 39 in the inductance 31. Similarly, the cathode 41 in the vacuum tube device 27 is connected to an adjustable point 42 in the inductance 34. The portion of the inductance between the adjustable point and the end farthest from the source serves as a tickler coil. This end of the inductance is, therefore, connected to the grid. Thus, the resonant circuit 33—31 is connected to the grid 43 in the tube 26. The connection includes a C-battery 44. In the same way, the resonant circuit 35—34 is connected to the grid 45 in the tube 27 and the connection includes a C-battery 46.

The inductances 31 and 34 serve as two primaries of an air-core transformer. The secondary is a coil 50, across which there is connected a condenser 51 to provide a circuit, resonant at radio-frequency. The output of this condenser includes a pair of vacuum-tube devices 53 and 54, which serve as rectifiers. For controlling the grids 55 and 56 of these rectifiers, any suitable connection to the line is provided. For specific illustration, this is shown as a transformer. The primary 57 of this transformer is connected directly across the source. There are two secondaries, 58 and 59, wound on the same iron core with the primary 57. One terminal of the secondary 58 is connected to the grid 55. The connection from the other terminal branches, one branch going to the cathode 61 of the vacuum tube 53 and the other branch going to the anode 62 of the vacuum tube device 54. Similarly, one terminal of the secondary 59 is connected to the grid 56 of the vacuum tube device 54 while the other terminal is connected both to the cathode 63 of the vacuum tube 54 and to the anode 65 of the other rectifier.

The resonant circuit 50—51 is directly connected to the output circuit by means of a conductor 67 at one side of the condenser 51. The other side of the condenser 51 is connected as shown by the conductor 68 to the common connection to the anode 62 and the cathode 61. The output circuit is connected on one side to the conductor 67 and on the other side to the common connection uniting the cathode 63 and anode 65 as shown at 69.

An inductor 71 in series and a condenser 72 in shunt are inserted in the output circuit 74—75.

For explaining the operation of this device, consider first the situation when the lower terminal of the source as shown on the drawing, is positive. At this moment, the plate 29 in the vacuum-tube device 27 will be negative, consequently, this tube will not now generate any oscillations. The tube 26, on the other hand, because it has a positive potential impressed upon the plate 28, will, generate oscillations. The frequency of these oscillations will be determined by the capacity and inductance in the resonant circuit 31—33. Their amplitude will be determined by the potential of the source, being small at each end of the half cycle and large in the middle thereof. The oscillations will be sustained throughout the half cycle during which the plate 28 is positive in the way explained above in connection with Fig. 1. During this half cycle, therefore, there will be induced in the secondary 50, a current which may be represented by the portion of Fig. 4 between the points A and B.

During the next half cycle, the plate 29 will be positive and the plate 28 negative. Consequently, the tube 27 will generate oscillations while the tube 26 will be inactive. The resonant circuit 34—35 will, therefore, impress energy now upon the secondary coil 50 and there will be induced in the circuit 50—51 a current represented by the portion of Fig. 4 between the points B and C. The whole of Fig. 4 from point A to point C represents a complete cycle and there is, therefore, in the circuit 50—51, a current alternating at high frequency but modulated at the frequency of the source 2.

If this current were delivered to a single rectifier, there would result a series of pulses represented by the portion of Fig. 5 between the points D and E which would repeat itself during each half cycle. Such a current would, however, even if passed through a transformer, have a very undesirable wave form and would be of double the frequency of the line current. To avoid this condition, the direction of these pulses is reversed each half cycle, whereby, during the second half cycle, the current in the output of the rectifier is like the portion of Fig. 5 between the points E and F.

During the first half cycle, the transformer 57 causes the grid 55 to be positive and the grid 56 to be negative. The vacuum tube 53, therefore, is conducting, but the vacuum tube 54, because of the negative charge on the grid, is non-conducting. The conduction by the tube 53 is, however, unilateral. It permits current to flow from the plate 65 to the filament 61 but not in the opposite direction. During this half cycle, therefore, pulses of current flow from the upper line 74 and to the lower line 75 passing through the load from one of these end lines to the other. During the next half cycle, the action of the transformer 57 makes the grid 56 positive and the grid 55 negative so that now the tube 54 has a unilateral conductivity and the tube 53 will not conduct. During this half cycle, therefore, pulses of current will flow to the upper line 74 and return through the load and the lower line 75. Since the current in lines 74 and 75 during the first half cycle is represented in Fig. 5 by the positive pulses between D and E, during the next half cycle the current in the opposite direction should be represented as negative and it is, therefore, correctly shown by the portion of Fig. 5 between the points E and F.

The envelope of the pulses shown in Fig. 5, closely approximates a sine wave. The current can be made to have the character indicated by this envelope instead of the separate pulses by the smoothing action of the inductor 71 and condenser 72.

It will be apparent to those skilled in the art that many variations in detail may be made and although I have illustrated but two forms of the single device and but one form of the double device, I do not intend to be limited except as necessitated by the prior art or indicated in the claims.

I claim as my invention:

1. In a power transmission system, a low frequency supply, two generators of high-frequency current each energized in turn from said supply during a half cycle of said low frequency, an output circuit energized by said generators and two rectifying devices oppositely arranged in said output circuit and controlled by said source, whereby each rectifier is rendered inactive during the energization of one of said generators respectively.

2. In combination, a low-frequency power line, two vacuum tube generators oppositely connected to said line, an output circuit energized from said generators, two vacuum-tube rectifying devices oppositely connected in said output circuit and having grids and means controlled by said power line for alternately charging the grids of said rectifying devices with opposite charges.

3. In a power system, a low-frequency source, two high-frequency generators energized alternately by said source during respective half-cycles of said source, two resonant high-frequency circuits energized respectively and alternately by said generators, a common high-frequency resonant circuit inductively coupled to said two circuits, and a rectifying means including a low-frequency device for reversing the direction of rectification.

4. The method of delivering power from an alternating current line which consists in generating high-frequency oscillations modulated at the frequency of said line, rectifying said oscillations and reversing the direction of rectification at each half-cycle of said line frequency.

In testimony whereof, I have hereunto subscribed my name this 5th day of December, 1923.

CHESTER T. ALLCUTT.